US006992725B2

(12) United States Patent
Mohsenian

(10) Patent No.: US 6,992,725 B2
(45) Date of Patent: Jan. 31, 2006

(54) VIDEO DATA DE-INTERLACING USING PERCEPTUALLY-TUNED INTERPOLATION SCHEME

(75) Inventor: Nader Mohsenian, Plainsboro, NJ (US)

(73) Assignee: NEC Electronics America, Inc., Santa Clara, CA (US)

( * ) Notice: Subject to any disclaimer, the term of this patent is extended or adjusted under 35 U.S.C. 154(b) by 655 days.

(21) Appl. No.: 10/027,617

(22) Filed: Oct. 22, 2001

(65) Prior Publication Data

US 2003/0081144 A1    May 1, 2003

(51) Int. Cl.
H04N 7/01     (2006.01)
H04N 11/20    (2006.01)

(52) U.S. Cl. ...................... 348/448; 348/448; 348/452; 348/699

(58) Field of Classification Search ........ 348/448–452, 348/699–701; H04N 7/01, 11/20
See application file for complete search history.

(56) References Cited

U.S. PATENT DOCUMENTS

| | | | |
|---|---|---|---|
| 5,019,903 A * | 5/1991 | Dougall et al. ............. | 348/448 |
| 5,493,338 A * | 2/1996 | Hong ......................... | 348/441 |
| 5,661,525 A * | 8/1997 | Kovacevic et al. ......... | 348/452 |
| 5,793,435 A * | 8/1998 | Ward et al. ................. | 348/448 |
| 5,929,918 A * | 7/1999 | Marques Pereira et al. . | 348/448 |
| 5,943,099 A * | 8/1999 | Kim ........................... | 348/448 |
| 5,995,154 A * | 11/1999 | Heimburger ................ | 348/448 |
| 6,108,041 A * | 8/2000 | Faroudja et al. ............ | 348/446 |
| 6,262,773 B1 * | 7/2001 | Westerman ................. | 348/448 |
| 6,438,275 B1 * | 8/2002 | Martins et al. ............. | 382/300 |
| 6,452,639 B1 * | 9/2002 | Wagner et al. ............. | 348/448 |
| 6,459,455 B1 * | 10/2002 | Jiang et al. ................. | 348/452 |
| 6,501,794 B1 * | 12/2002 | Wang et al. ........... | 375/240.08 |
| 6,509,930 B1 * | 1/2003 | Hirano et al. ............... | 348/452 |
| 6,591,398 B1 * | 7/2003 | Kondo et al. ............... | 348/451 |
| 6,606,126 B1 * | 8/2003 | Lim et al. ................... | 348/452 |
| 6,611,294 B1 * | 8/2003 | Hirano et al. ............... | 348/459 |
| 6,636,267 B1 * | 10/2003 | Adachi ....................... | 348/448 |
| 6,661,464 B1 * | 12/2003 | Kokkosoulis et al. ....... | 348/448 |
| 6,686,923 B2 * | 2/2004 | Ji et al. ....................... | 345/606 |
| 6,690,427 B2 * | 2/2004 | Swan ......................... | 348/448 |
| 6,731,342 B2 * | 5/2004 | Shin et al. .................. | 348/452 |
| 6,757,022 B2 * | 6/2004 | Wredenhagen et al. ..... | 348/452 |
| 6,782,132 B1 * | 8/2004 | Fogg .......................... | 382/232 |
| 6,873,368 B1 * | 3/2005 | Yu et al. ..................... | 348/441 |
| 2001/0008425 A1 * | 7/2001 | Shin et al. .................. | 348/452 |
| 2002/0054236 A1 * | 5/2002 | Wredenhagen et al. ..... | 348/452 |
| 2002/0171759 A1 * | 11/2002 | Handjojo et al. ........... | 348/452 |
| 2003/0095206 A1 * | 5/2003 | Wredenhagen et al. ..... | 348/448 |

* cited by examiner

Primary Examiner—Brian Yenke
(74) Attorney, Agent, or Firm—Skjerven Morrill LLP

(57) ABSTRACT

A de-interlacing architecture is taught. The de-interlacing architecture adopts a perceptual model to measure membership probabilities for a collection of image samples of an interlaced video source with respect to extracted static, motion, and texture image components of the same collection. The probabilities are used to prioritize contributions from the three image components and produce a progressive video sequence which is a summation of the portions of the aforementioned components. The perceptual model uses a dual-stage motion-based image difficulty measuring scheme to equalize contributions from the three image components in a manner that video artifacts in the output signal are least perceptive. A parameter mapping technique composed of several logic units, a decision function, a weight assignment block, and a look-up table, will be presented to derive the final component weights. The mapping technique contains a multitude of thresholds and decisions which aid in interpolating the missing lines of the progressive frame.

10 Claims, 9 Drawing Sheets

| FlagSig | Ms | Mm | Mt |
|---------|------|----|------|
| 0000 | 0 | U2 | Ts |
| 0001 | 0 | Q3 | Amot |
| 0100 | A1 | Q1 | 0 |
| 0101 | 0 | Q2 | As |
| 0110 | Ps | Q2 | Qs |
| 1000 | T1 | U1 | 0 |
| 1001 | 0 | U2 | Ts |
| 1010 | Tm | U2 | Us |
| 1100 | Amot | Q3 | 0 |
| 1101 | 0 | Q3 | Amot |
| 1110 | Pmot | Q3 | Qmot |

FIG. 7

VIDEO DATA DE-INTERLACING USING PERCEPTUALLY-TUNED INTERPOLATION SCHEME

BACKGROUND OF THE INVENTION

1. Field of the Invention

This invention is generally related to display devices such as television monitors or liquid crystal displays, and more particularly to the field of video scan rate conversion from interlace to progressive format.

2. Description of the Related Art

Recent advances in digital televisions and flat-panel displays have greatly impacted the use of progressively scanned video formats. Video data are conventionally produced in the 2:1 interlaced scan rate for transmission and broadcast applications whereas the computer community uses the 1:1 progressive scan rate. The advantages of interlaced (I) video signals are that half the samples in a frame are updated in time, and therefore, half the bandwidth of the source is sufficient for data processing. On the other hand, progressive (P) scans display less flicker, are visually more pleasing, and are less stressful on human eye. Finally, progressive video materials are more amenable to video compression systems adopted in today's digital television (DTV) broadcasts.

Currently, interlaced and progressive formats co-exist in DTV industry. A domestic video display can be based on progressive scan technology. Therefore, video receivers often include format converters to change the nature of the signal from interlaced to progressive. A display can be an advanced flat-panel device capable of showing progressive video content up to the High Definition Television (HDTV) Signal or an intermediate display showing progressive Standard Definition Television (SDTV) Signal. Video Graphics Arrays (VGAs) and Personal Computers (PCs) are also used for progressive display of high resolution video, e.g., HDTV and SDTV, or low resolution video, e.g., ¼th or ⅛th of a SDTV signal.

Typically, a multimedia device (also called a set-top box or "STB") is used to decode the audiovisual information and display the output. A set-top box typically includes a scan-rate converter (also called a "de-interlacer"), to convert data received in an interlaced format to a progressive format. In the absence of de-interlacing techniques, various degrees of interlaced artifacts are perceived when representing an interlaced material on a progressive monitor. For example, a PC monitor will demonstrate aggregated object contours when fed with interlaced broadcast material over the Internet, i.e., web-casting. In comparison, a high-end monitor will use an internal circuit in an attempt at de-interlacing. As discussed further in the paragraph below, neither conventional PC monitors nor television monitors using an internal circuit provide a suitably clear image.

Traditional approaches to de-interlacing have been based on spatial filtering, temporal filtering, vertical-temporal filtering, and median filtering. Traditional approaches can also include some form of edge enhancements. However, the major challenge with developing a robust de-interlacer is that interlaced sources are non-stationary in nature, and therefore, deriving an interpolation method for production of progressive outputs depends on video content. For example, static areas will benefit from temporal filtering while moving areas will look better with some form of spatial filtering. If the interlaced video is truly static, then the temporal displacement from frame to frame is almost zero, and the two fields of same frame are perceived as if they have been sampled at the same time. In this scenario the samples of one field can be repeated in time (a process called field insertion) to fill the new lines of the progressive output frame. Temporally repeating samples of one field to fill new lines of the progressive output frame is a process defined as temporal filtering.

However, if the interlaced video contains rapid motion, then the field-to-field temporal correlation within a single frame is weak and the operation of an (intra-field) spatial filtering is more suitable. An actual video sequence rarely, if ever, includes only one static data or rapid motion. Therefore, due to the nature of actual video sequences, opportunities for improvement are available over both temporal and spatial filtering.

Real-world video sequences are typically comprised of many dissimilar objects displaced at different velocities. An obvious solution for de-interlacing image samples with different grades of motion is to construct a filter that would dynamically change its behavior from spatial filtering to temporal filtering. The solution should also dynamically change from temporal filtering to spatial filtering. A simple way to accomplish this is applying a multi-tap median filter to the closest spatial and temporal neighboring samples of the interpolated samples. The usefulness of the median filter is motivated by the fact that if motion samples are fed to the filter, then the output will be one of the spatially positioned source pixels. This is because the self-similarity of the spatial pixels would be greatest as compared to the similarities between spatial and temporal pixels. On the other hand if the input samples are static, then all temporal and spatial pixels are self-similar and the output should be a good representative of either sampling group. However, if the region of interest happens to be static with many horizontal edges then it is likely that the median filter would destroy the edge pixels and the output frame would lack image detail. It is widely known that median filtering works well on fast motion areas but removes the vertical details of the interlaced source material.

Another classical filtering scheme for de-interlacing is the vertical-temporal filtering technique. In this approach a mask which typically extends over two or three fields in temporal direction and has several taps in vertical direction, is adopted. This mask is designed such that the filtering coefficients of the dominant field (the field to be interpolated) are of a low-pass filtering type and filtering coefficients of adjacent field(s) are of high-pass filtering type. This design concept ensures that the dominant image structures of the interlaced source field are present in the output progressive frame, and further, any vertical image detail that may be present in the neighboring fields are preserved in the output. Vertical-temporal filtering has certain disadvantages. For example, objects with non-vertical edges produce jerkiness under sudden accelerations.

One way to improve above de-interlacing schemes is to apply the filter coefficients in a direction where inter-pixel correlation is strongest. This way any image artifacts caused by the interpolation process has the least disruptive effect on the quality of the output video. This extension, used as an edge enhancement strategy, is described in prior art dealing with the problem of de-interlacing.

More advanced schemes have used motion estimation (ME) methods in combination with classical filtering techniques to offer more efficient solutions. These ideas are motivated by the fact that the amount of motion in the interlaced video sequence needs to be identified before proper filtering techniques are applied. Motion estimation can be performed on an interlaced video sequence to determine the best prediction and the amount of motion for a pre-defined area of a moving frame. For the ease of hardware realization, motion is estimated for blocks of image samples. ME techniques have been adopted in many different ways in de-interlacing schemes to predict the missing samples of the output progressive material. One approach is to fill the missing lines by the best predicted samples from past or future. A de-interlacer which fills in missing lines by predicted samples is dependent on the efficiency of the ME technique. Artifacts in the output pictures result when the ME technique provides other than the correct prediction. In an attempt to reduce, or eliminate these artifacts, a protective device in form of a median filter, is applied to a region of interest composed of predicted and source samples. A median filter improves the ME-based de-interlacer significantly at times but will destroy the vertical image details. Another way to take advantage of the ME technique is to measure the amount motion and incorporate a switch in the de-interlacer that would toggle between a temporal interpolator and a spatial interpolator.

An ideal ME solution requires storage of many frames of data. The added memory increases the cost of the overall hardware device, i.e., STB-chip or a stand-alone single-chip de-interlacer, and the delay associated with representing the output frames. Further, a large number of block-based ME tasks have to be performed for a block of image samples and a fixed block size is often not optimal for video objects of different sizes. Therefore, the existing approaches provide less-than-optimum results. The large memory and associated delay also make the design and development of an efficient de-interlacing architecture impractical, especially when large HD frames are processed.

What is needed is a means to de-interlace video data from an interlaced format to progressive format. A means of de-interlacing which provides an economical and efficient means of de-interlacing would be of additional benefit. A means of de-interlacing which can be incorporated into a single integrated circuit chip for integration into a set-top box or integration into a flat-panel (plasma) display would be of further benefit.

SUMMARY OF THE INVENTION

In accordance with the present invention, a method is taught of de-interlacing video data using a perceptually-tuned interpolation scheme. As discussed previously (refer to Description of the Related Art, above), the efficiency of a ME-based de-interlacer is strongly related to the robustness of the motion estimation procedure. Such robustness depends on several conditions, each creating a major challenge in realizing a hardware unit which can be integrated in a single STB chip. In order to estimate the motion trajectory of video objects with sufficient precision, a large segment of the source sequence encompassing the field under conversion is stored in a large buffer and examined. The actual examination is carried out by moving data across a dedicated memory bandwidth onto a temporary storage area where an on-chip central processing unit implements the actual hardware computations. However, this memory bandwidth is accessed by several hardware units of the STB integrated circuit. Due to the operating frequency and memory bandwidth of current STB integrated circuit, even the most sophisticated arbitration procedures can not keep up with the volume of the data. Hence, it is necessary to reduce the number of pictures of the video segment under examination. Another challenge for ME techniques is the size of a motion window for which object displacement is to be obtained. A typical video contains many objects of dissimilar sizes traveling towards different directions with variable speeds. Therefore, an algorithm that can vary the size of the window to match the video object seems to be the best candidate. However, a suitable algorithm cannot be implemented on a single STB integrated circuit. Instead a fixed motion window of 16×16 pixels, being most suitable for chip design, is generally adopted for ME techniques. Finally, a large search window, superimposed on motion window, is needed to find the best prediction.

In this disclosure, a de-interlacing method which minimizes the frame storage requirements is taught. The method also minimizes processing power associated with using motion estimation. Only a three field memory is needed for the method and one block-based motion estimation task is utilized. The quality of the de-interlacer is ensured by incorporating perceptual measures which are obtained from the image samples and assisted by the ME process.

Consider three consecutive fields labeled as (n−2), (n−1), and n, which are presented to the de-interlacer architecture and stored in memory. A field can be of "top" or "bottom" parity and typically the lines of the top field are located on top of the lines of the bottom field when an interlace frame is constructed from both fields. Sampling positions of the fields are shown in FIG. 1. In this example, fields (n−2) and n are of top parity while field (n−1) has bottom parity. Interlace frame (n/2−1) is formed from top field (n−2) and bottom field (n−1). This means that the samples of frame (n/2−1) are scanned at different times, and further, the vertical lines of frame (n/2−1) are twice the number of fields. It is the object of this invention to create progressive frames whose samples are to be scanned at the same time. In the exemplary implementation, the number of vertical lines of a progressive frame is twice the number of lines of a field.

According to the disclosure, the fields are fed to a bank of filters to extract static, motion, and texture image components for a region of interest (ROI). Each of the three components play a major role in converting the scan rate of the source from interlaced to progressive. For example, if the source is purely static or (fast moving) then only the static (or motion) image component will be used to produce the progressive region of interest. If the source contains features of higher orders, then the texture component is incorporated into the final result. Video information is inherently rich in form of visual features and it is likely that any ROI is comprised of a mixture of many features. Hence, a scan conversion framework capable of forming a bond between the main image components, in the most perceptually pleasing manner, is highly desirable. Video sequences have many dissimilar ROIs which have to be bounded and have a regular shape for a hardware information processor. These boundary conditions impose a precision barrier on feature identification of pixels, and in particular the pixels neighboring the contours of the ROIs. Other factors such as instrument noise, luminance or contrast changes, and special effects, challenge the accurate extractions of spatio-temporal features. Since each pixel cannot be assured of having a single feature-type, the de-interlacer framework has to manage a transition from contribution of one type image component to another. As a result of mixed features, a pixel may have multiple memberships (e.g., belongs to multiple sets).

As explained further below (refer to Detailed Description), a perceptual frame work is taught using dual-stage motion-based image difficulty assessments, spatial activity assessments, and the magnitude of the motion vectors to set up a mapping function. The mapping functions determine how aggressively each type of image feature of the interlaced source will contribute to the interpolated lines of the outgoing progressive video material. The perceptual model is used to adjust or modulate contributions from static, motion, and texture image components of a field and sum the adjusted or modulated components to obtain the de-interlaced output frame.

The disclosure teaches a region of interest (ROI) of rectangular shape, and hence, the three fields (n−2), (n−1), and n, are partitioned into non-overlapping N×M blocks. Each field is scanned from left to right and top to bottom in a block-wise manner with each block enumerated by index i. Motion is estimated between fields of the same parity, e.g., field (n−2) and field n, by computing block-based horizontal and vertical motion vectors. Motion is estimated for an arbitrary block i in field n by displacing the block i of field (n−2) inside a larger rectangular block of size (N+v)×(M+h) as depicted in FIG. 2. After every pixel position within the search window (N+v)×(M+h) is examined via comparing all displaced versions of block i of field (n−2) with block i of field n, the best match is readily found. This prediction corresponds to motion vector MV comprised of vectors MVx and MVy as shown in FIG. 2. The set (MVx, MVy) represent the amount of motion which is used for interpolation of the block i in field (n−1). The motion vectors can be fine tuned by examining sub-pixel positions closest to the position of the displaced block. The disclosure teaches using half-pixel ME to further refine the prediction which was derived with full-pixel precision. Therefore, MVx and MVy of FIG. 2 include the half-pixel refinement. The rest of the parameters are discussed further below (refer to FIG. 2).

If the amount of motion for a block of pixels is found to be very small, e.g., close to zero, then the block is defined as static and the static image component is used to de-interlace the samples. However, due to certain limitations (described previously), some of the pixels of the block may not belong to the static feature set. For example, part of the block could be moving but it may be small enough not to influence the direction of the motion trajectory. In this case, the block difference of the best prediction and block i of field n explains the reliability of the motion information. For the scenario of zero amount of motion, block differences are typically close to zero. But if a large block difference is computed along with zero motion, the motion information is characterized as unreliable and the pixel block is not purely static. Alternatively, if a block contains a significant amount of image detail it will produce a large block difference regardless of any amount of motion present in the block. Therefore, scaling the prediction error by a block difficulty indicator provides a reliability factor. The reliability factor is used to identify pseudo-static image blocks.

In this disclosure an adjustment of the static image component of block i of field (n−1) is taught. According to the method taught block i has a small amount of motion. The adjustment is comprised of reducing the component by a modulated version of the component. The modulation factor equals to scaling an average block difference by a difficulty indicator. The average block difference is obtained from computing the average energy of the block difference between a predicted block and another block of an adjacent field in the future. The predicted block belongs to an adjacent field in past and the difficulty indicator is obtained from the samples of block i of field (n−1). Moreover, for block i of field (n−1), a modulation factor is defined as Ra(i, n) and the block difference is defined as db(i, n). For the case where the predicted block is a result of using zero motion vectors, the block difference is defined as db0(i, n).

Although a 16×16 block size is sufficiently large to be most suitable for estimation of true motion, the actual de-interlacing requires pixel-based precision. A local reliability factor is defined to fine-tune the membership of pixels belonging to the static set. A sub-set of block i of field (n−1) surrounding the pixel of interest and of size N2×M2 is chosen and defined as sub-block j. The method identifies the corresponding sub-block j in field n and its predicted version in form of sub-block j in field (n−2). The same motion information derived by the 16×16 block is used for the displacement of the sub-block. Constants N2 and M2 can be set at 3, or another suitable value. The method computes a sub-block vertical activity indicator from pixels of sub-block j in fields n and (n−2). An average sub-block difference between sub-block j of field n and its prediction is obtained. The sub-block difference is defined as dsb(j, n).

In an embodiment, the static image component of block i of field (n−1) is adjusted by reducing the component by a modulated version of the component. The modulation is obtained by increasing Ra(i, n) by further modulating Ra(i, n) by a factor RSa(j, n). This modulation factor is the average difference between a predicted sub-block j and another sub-block j of an adjacent field in future. The predicted sub-block belongs to an adjacent field in past and the difference is scaled by a sub-block vertical activity indicator of the sub-blocks of the adjacent fields in past and future.

In some cases the amount of motion for a block of pixels is small. In this case the final interpolated pixels within the same block are a summation of an adjusted static image component and a portion of a motion image component. The static image component is reduced by a term equal to factor Ra(i, n) or factor Ra(i, n)×(1+RSa(j, n)) times the static image component and the motion image component is modulated by exact factors.

An arbitrary block of pixels has spatial image characteristics in addition to temporal features. Therefore, the nature of the blocks is examined to ensure high quality de-interlacing. The block can be low-active (e.g., flat), composed of edges, or have high order of image details (e.g., texture). Blocks having a high order of image details are of special interest because the details of the local texture will overlap into neighboring fields with or without orientation changes. Therefore, there is a need for texture image component extraction in the proposed de-interlacing architecture. The other types of spatial image blocks (including hybrid types) can be modeled by the static image component or a mixture of static and texture image components as described later in this disclosure.

Textures are composed of many dissimilar frequency orientations. Pixel differencing in texture domain produces large numbers, therefore the average energy of texture-based block differences can be large. The method defines and determines a parameter (e.g., Ra(i, n)) to determine if a block under observation is largely populated by texture material. The method defines average energy of the block difference (e.g., db(i, n)) as aed(i, n). If the average energy is larger than a predefined threshold (for example, ten) and Ra(i, n) is larger than a second pre-defined threshold (for example, 0.4) then the block under observation is declared as texture. A texture image component is obtained to represent the spatial characteristics of the block. If both aed(i, n) and Ra(i, n) are smaller than the corresponding thresholds, then the block is relatively low-active and static image component is sufficient to represent its spatial behavior. If any other condition occurs regarding the comparison of aed(i, n) and Ra(i, n) with the pre-defined thresholds, then an adjusted static image component and a modulated texture image component are summed to obtain the de-interlaced samples. In this case the static image component is reduced by a modulated static image component term. (The modulation factor can be defined as RSa(j, n).) Modulating the texture image component by a factor such as RSa(j, n) ensures that the temporal and spatial measurements are equalized when a pixel block includes both edge and texture material. The factor uses a larger portion of the texture image component if membership of texture pixels are found stronger (i.e., larger block error) or would use a larger portion of the static image component if membership of edge pixels are stronger (i.e., larger vertical activity). In the latter case the dominance of static component is important for preservation of vertical image details (i.e., horizontal edges). For ease of explanation of the de-interlacing procedure for pixel blocks where motion is moderately or strongly present, the previously computed samples are defined as spatial image components. Therefore, a spatial image component can be static, texture, or combination of both.

The disclosure contains, by necessity, simplifications, generalizations and omissions of detail; consequently, those skilled in the art will appreciate that the disclosure is illustrative only and is not intended in any way to be limiting.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 7 depicts one example of coefficients and the relationship with a signal.

DETAILED DESCRIPTION

The following sets forth a detailed description of a mode for carrying out the invention. The description is intended to be illustrative of the invention and should not be taken to be limiting. A de-interlacing architecture is taught. The de-interlacing architecture adopts a perceptual model to measure membership probabilities for a collection of image samples of an interlaced video source with respect to extracted static, motion, and texture image components of the same collection. The probabilities are used to prioritize contributions from the three image components and produce a progressive video sequence which is a summation of the portions of the aforementioned components.

Figure 1:
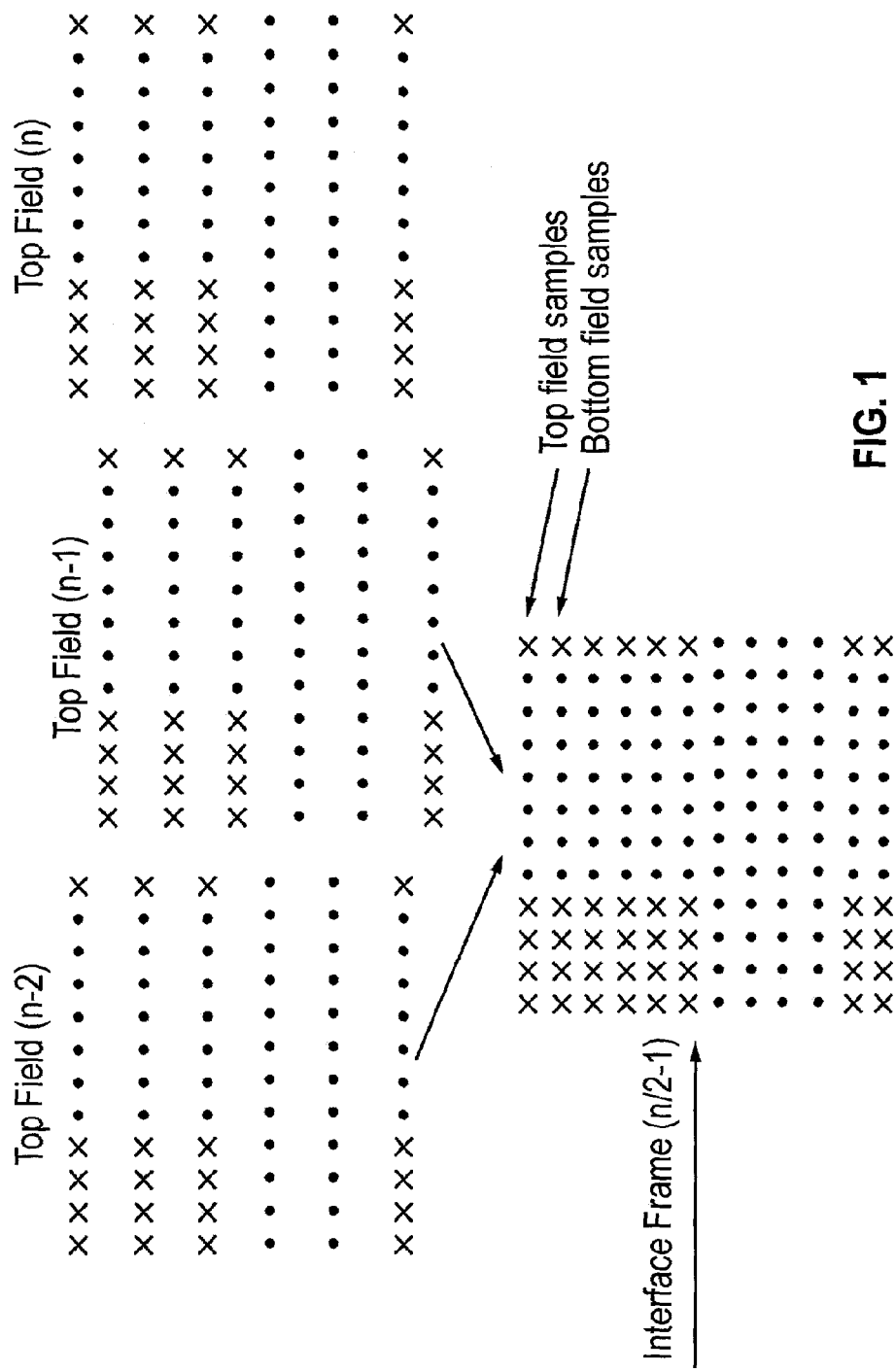
FIG. 1 depicts an example of sampling positions of top and bottom fields and an interlace frame constructed from the sampling positions.
Figure 2:
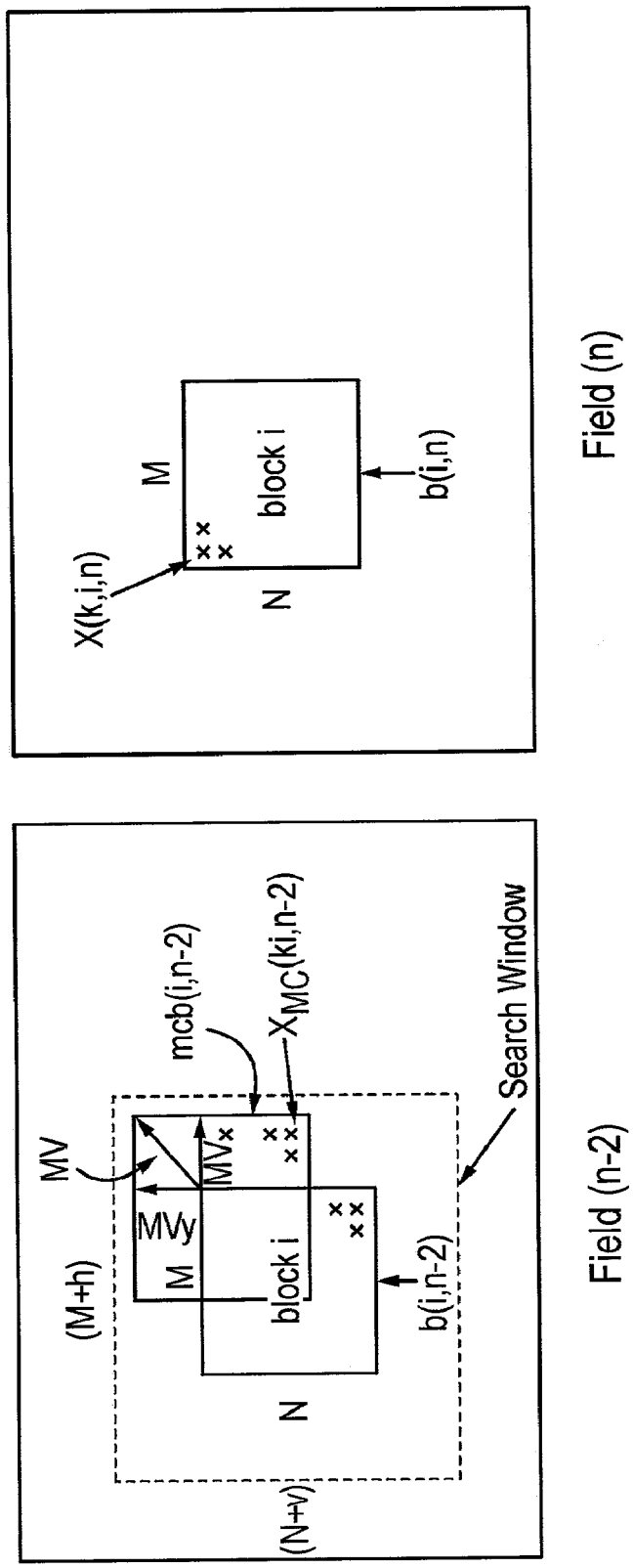
FIG. 2 depicts a block diagram of one implementation of a motion estimation procedure in accordance with the present invention.
Figure 3:
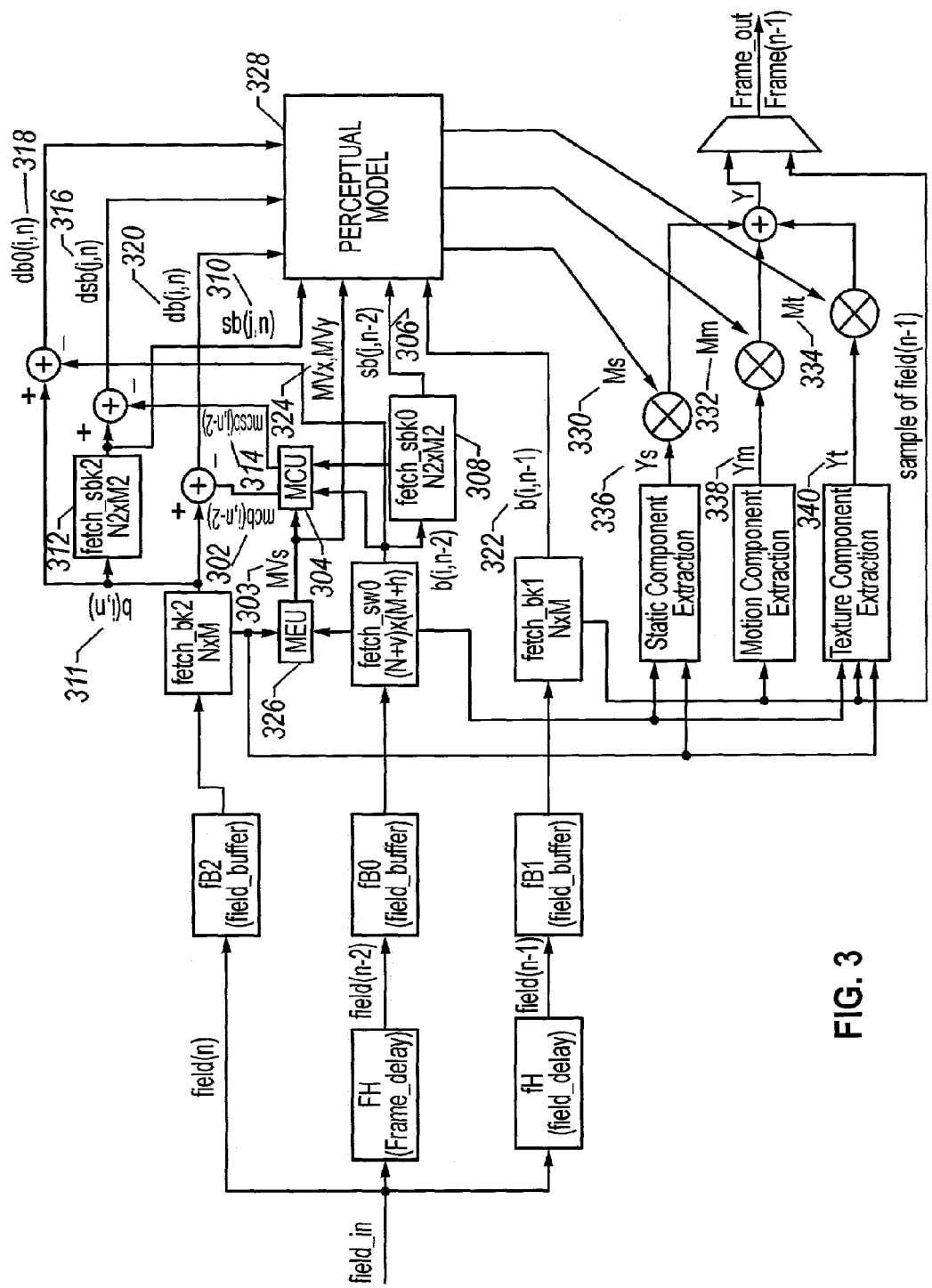
FIG. 3 depicts one embodiment incorporating and implementing the perceptual model to determine portions of static, motion, and texture components of interlaced video sequence and reconstruct the output progressive video sequence.

Consider field (n−1) which together with a field immediately in past or future would form an interlaced frame. Index (n−1) defines the temporal location of the field (n−1). In order to convert the scan rate of field (n−1) to a progressive scan rate, field (n−1) and two adjacent fields in past (field (n−2)) and future (field n) are fed to the de-interlacer architecture. It should be noted that field (n−2) was previously converted to progressive mode. Only the original interlaced samples of field (n−2) are utilized in the de-interlacing scheme as shown in FIG. 3. Field n is not yet de-interlaced. Three contiguous fields are needed for scan rate conversion, therefore, three field buffers are employed. Field n is stored in buffer fB2 while its frame delay (field (n−2)) and its field delay (field (n−1)) are stored in buffers fB0 and fB1, respectively. Each field is partitioned into non-overlapping rectangular N×M blocks. Further, during pixel processing, each field is scanned from left to right and top to bottom in a block-like fashion with each N×M block identified with index i. Therefore, an arbitrary block i in field n is defined as b(i, n) (see FIG. 2).

The de-interlacing procedure for field (n−1) estimates the motion for a block b(i, n−1) by first selecting the corresponding blocks b(i, n−2) and b(i, n). Block b(i, n−2) is displaced within a search window to predict the best match for reference b(i, n). N×M blocks b(i, n−1) and b(i, n) are fetched from field buffers using fetch_bk1 and fetch_bk2, respectively. A search window of size (N+v)×(M+h), superimposed on block b(i, n−2) is fetched from field buffer fB0 via fetch_sw0. Nominal values for N and M are 16 and for v and h are 128. The pixel elements from fetch_sw0 and fetch_bk2 are supplied to the motion estimation unit (MEU). The MEU circuit displaces b(i, n−2) within the larger (N+v)×(M+h) window, searching every possible pixel position, to find the best prediction for b(i, n). The best prediction is typically obtained by minimizing the mean absolute error (MAE) between samples of b(i, n) and candidate blocks within the search window. This prediction corresponds to a set of displacement or motion vectors which are measured by counting the number of pixels the best match has moved from the original position of b(i, n−2). FIG. 2 shows an example of a predicted N×M block within search window in field (n−2), horizontal motion vector (MVx), vertical motion vector (MVy), and a reference block b(i, n) of field n. After the (MVx, MVy) set is obtained, a motion compensation unit (MCU) is used to displace b(i, n−2) within the search window and compute the block mcb(i, n−2). The best prediction for b(i, n) is represented by mcb(i, n−2). A difference N×M block db(i, n) is obtained by subtracting mcb(i, n−2) from b(i, n) pixel by pixel.

Let each pixel of b(i, n) be represented by X(k, i, n) and each pixel of mcb(i, n−2) be $X_{MC}(k, i, n-2)$ as shown in FIG. 2. Index k ranges from 0 to (N×M)−1. Each sample of db(i, n) is then represented by $X_{MC}(k, i, n-2)-X(k, i, n)$. Further, a block db0(i, n) is obtained by subtracting b(i, n−2) from b(i, n) as shown in FIG. 3. Therefore, each sample of db0(i, n) is represented by X(k, i, n−2)−X(k, i, n).

FIG. 3 shows a dual-stage motion-based strategy. In the first stage an N×M prediction block in form of mcb(i, n−2) 302, is calculated via the MCU unit, 304. Therefore, the calculation considers a large block size to determine the motion. Pixel-precision is relevant to high-quality de-interlacing. A smaller sub-block sb(j, n−2) 306 of size N2×M2 is extracted from block b(i, n−2) via fetch_sbk0, 308. Similarly sub-block sb(j, n) 310 is extracted from b(i, n) 311 through fetch_sbk2, 312. Therefore, in the second stage sb(j, n−2) 306 is motion compensated using the same vector sets procured in the first stage, resulting in mcsb(j, n−2), 314. Finally, sub-block dsb(j, n) 316 is obtained by subtracting mcsb(j, n−2) 314 from sb(j, n). Difference blocks db0(i, n) 318 and db(i, n) 320, difference sub-block dsb(j, n), original sub-blocks sb(j, n) and sb(j, n−2), original block b(i, n−1) 322, and motion vectors MVx and MVy 324 (provided by MEU unit 326) are input to the perceptual model, 328. Perceptual model 328 interprets the data and computes modulating factors Ms 330, Mm 332, and Mt 334, for static, motion, and texture image components, respectively. Because most local image features are inter-mixed it is likely that the aforementioned components have been embedded in the content. The circuitry of the static component extraction measures the amplitude of the image components. Other possible features are handled as special case of above components.

Figure 4:
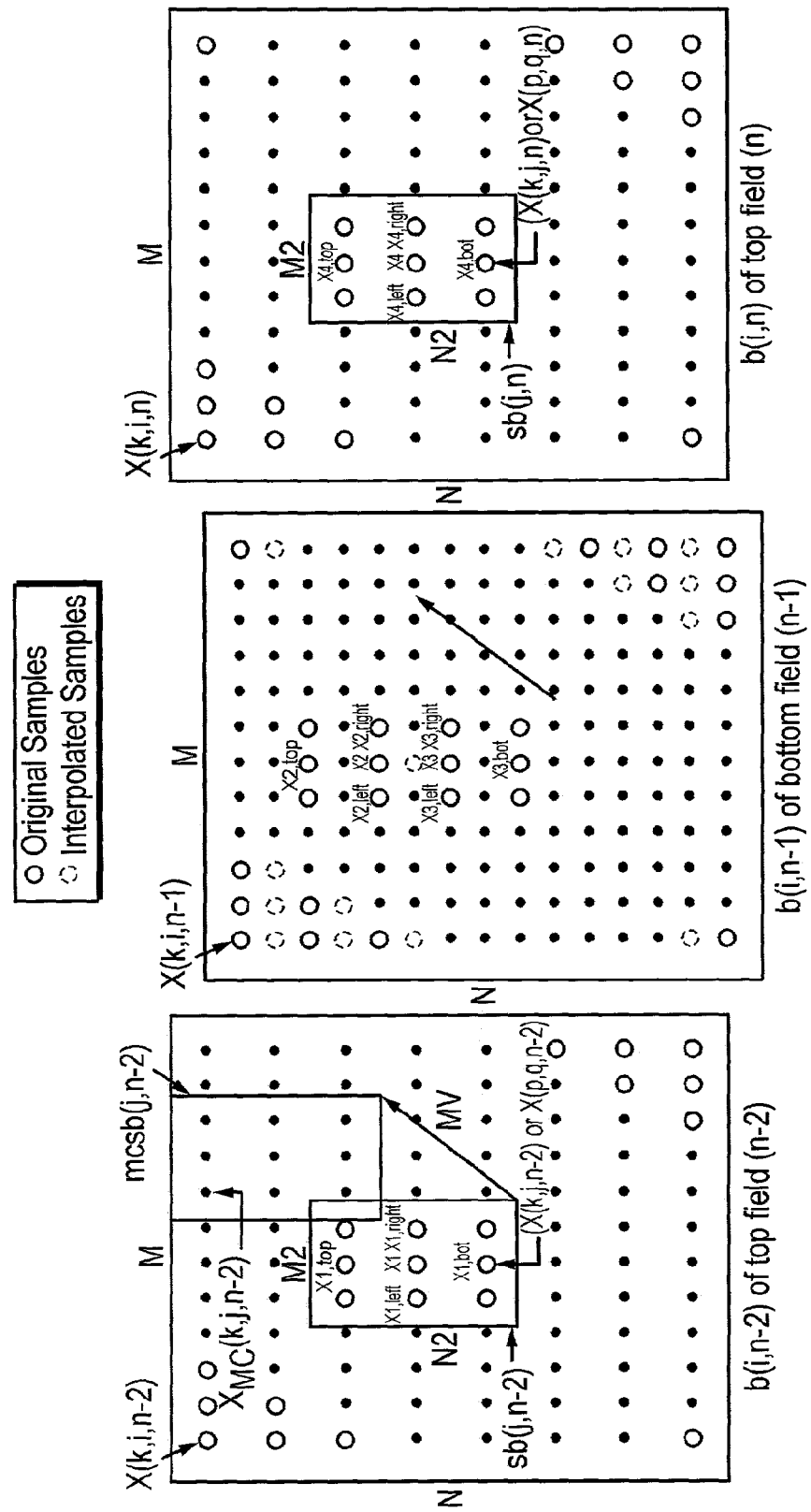
FIG. 4 depicts diagram of pixel blocks, sub-blocks, and elements of masks used for static, motion, and texture image component extraction for interpolated pixel Y in accordance with the present invention.

Spatial and temporal operators are used to extract the static, motion, and texture image components. FIG. 4 shows the samples which are used to construct the image components. In FIG. 4, the final interpolated pixel is shown as Y. All other interpolated pixels are obtained using the same strategy used for Y throughout this disclosure. The interpolated pixels together with the original field lines form the output progressive frame.

The circuitry of the static component of extraction of FIG. 3 operates on samples from fields (n−2) and n. Samples are selected which are temporally closest to sample Y. One method of extracting the static component for sample Y is to select pixels X1 and X4 and the four closest pixels in spatial directions as denoted in FIG. 4. Then static component Ys 336 is computed as shown in Equation 1, below:

$$Y_S = \sum_{i=1,4} (1/2)(a_{i,left}X_{i,left} + a_i X_i + a_{i,right}X_{i,right} + a_{i,top}X_{i,top} + a_{i,bot}X_{i,bot})$$

Equation (1)

where constant a's are set as: $a_{i,left}=a_{i,right}=3/16$, $a_i=1/2$, and $a_{i,top}=a_{i,bot}=1/16$. FIG. 3 also shows motion component extraction adopting intra-field pixel processing. Samples from field (n−1) which are spatially closest to Y (refer to FIG. 4) are chosen to compute Ym 338, where Ym 338 represents the motion image component for pixel Y. One method for motion component extraction is to apply the intra-field operators as shown in Equation 2, below:

$$Ym = a_{2,top}X_{2,top} + a_2 X_2 + a_3 X_3 + a_{3,bot}X_{3,bot}$$

Equation (2)

where constant a's are selected as: $a_2=a_3=7/16$ and $a_{2,top}=a_{3,bot}=1/16$. The texture component extraction shown in FIG. 3 uses intra-field and inter-field pixel processing to compute texture component Yt 340 for pixel Y. The intra-field operators preserve the base-band energy of the samples and are operated on field (n−1). The high-band features of the samples are extracted via inter-field operators. Inter-field operators are applied to field (n−2) and n. One method of computing component Yt is to choose the closest spatial and temporal samples to sample Y (refer to FIG. 4), and apply the operators as shown in Equation 3, below:

$$Yt = \sum_{i=1,4} (a_{i,left}X_{i,left} + a_i X_i + a_{i,right}X_{i,right} + a_{i,top}X_{i,top} + a_{i,bot}X_{i,bot}) + \sum_{i=2,3} (a_{i,left}X_{i,left} + a_i X_i + a_{i,right}X_{i,right}) + a_{2,top}X_{2,top} + a_{3,bot}X_{3,bot}$$

Equation (3)

In Equation 3, constant a's are set for i=1, 4 as: $a_{i,left}=a_{i,right}=-1/4$, $a_1=1, a_{i,top}=a_{i,bot}=-1/4$. In Equation 3 constant a's for i=2, 3 are set as: $a_{i,left}=a_{i,right}=1/8$, $a_i=7/32$, $a_{2,top}=a_{3,bot}=1/32$.

After calculating components Ys 336, Ym 338, and Yt 340, the interpolated sample Y is obtained by summing the modulated components. Each component is modulated by a corresponding factor deduced from the perceptual model and added as formulated as shown in Equation 4, below:

$$Y = Ms \times Ys + Mm \times Ym + Mt \times Yt$$

Equation (4)

As shown in FIG. 3, combining the interpolated sample Y with original sample from field (n−1) constructs the sampling grid for the new progressive frame (n−1).

Referring again to FIG. 3, the perceptual model of the de-interlacer analyzes the motion information, the multi-stage predictive errors derived from the ME task, and the original samples of the interlaced fields to determine the degree of presence of image features in the output progressive frame. For spatially-varying and temporally-varying local structures, the quality of the images a viewer sees on a progressive grid is related to the fact that interlaced artifacts must be least perceptive. The existence of such artifacts is correlated to the accuracy of the motion intelligence. The local image details aid in suppressing the perception of picture artifacts, therefore, the visual impact of the interlaced artifacts can be minimized in the areas where a large amount of local image detail is present. These observations are transformed into formulations to perceptually tune the fraction of the image components such that the progressive frames are perceived in the manner most satisfactory to the viewer.

Figure 5:
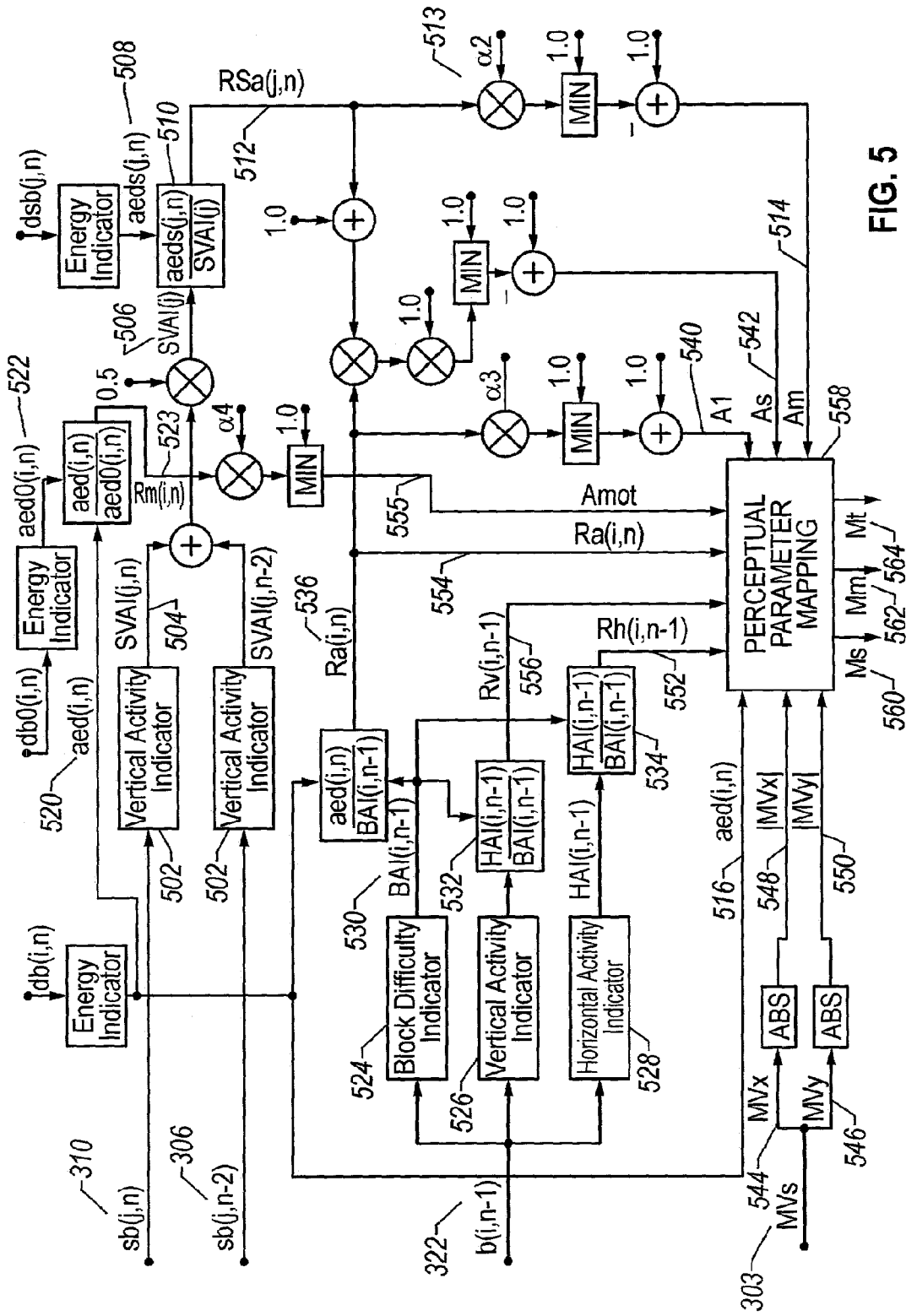
FIG. 5 depicts one embodiment of the perceptual model to convert image statistics to perceptual weights through a parameter mapping model.

FIG. 5 shows one embodiment of the perceptual model consistent with the present invention. As shown in FIG. 5, sub-blocks sb(j,n) 310 and sb(j,n−2) 306 are input to the vertical activity indicator, 502. The vertical activity indicator 502 uses a pre-defined vertically oriented operator on samples of the sub-block. Note samples X(p, q, n) where p and q are the row and column indices of sub-block sb(j, n) 310, respectively. For sub-block sb(j, n) of FIG. 4 where a 3×3 dimension is used, the output of the vertical activity indicator 502 is defined by SVAI(j, n) 504, and derived as:

$$SVAI(j, n) = \sum_{q=0}^{2} |-0.25X(0, q, n) + 0.5X(1, q, n) - 0.25X(2, q, n)|$$

Equation (5)

Similarly, SVAI(j, n−2) is computed by using Equation (5) with X(p,q,n) replaced by X(p,q,n−2). As shown in Equation (5), SVAI(j, n−2) is computed by multiplying the operator of the vertical activity indicator 502 on sub-block sb(j,n−2).

An average vertical activity indicator SVAI(j) is calculated (i.e., SVAI(j)=0.5×(SVAI(j, n)+SVAI(j, n−2)). Parameters SVAI(j) 506 and aeds(j, n) 508 are input to divider 510 which computes ratio RSa(j,n) as the output 512: RSa(j, n)=aeds(j,n)/SVAI(j). The average energy of the sub-block dsb(j, n) is defined as aeds(j, n) 508. Using the same analogy used for defining the elements of blocks db(i, n) 320 and db0(i, n) 318, as outlined in the beginning of this section, each sample of dsb(j, n) 316 is represented by $X_{MC}(k, j, n-2)-X(k, j, n)$. Examples of $X_{MC}(k, j, n-2)$ and $X(k, j, n)$ are given in FIG. 4. Therefore, for a 3×3 sub-block dsb(j, n) 316, aeds(j, n) 508 is computed from the energy indicator block using Equation 6, below:

$$aeds(j, n) = (1/9)\sum_{k=0}^{8} |X_{MC}(k, j, n-2) - X(k, j, n)| \quad \text{Equation (6)}$$

Ratio RSa(j,n) 512 is modulated by constant α2 513 and, then compared to integer 1.0 to identify the lessor value. The result is subtracted from integer 1.0 and labeled as Am, 514. Constant α2 along with all other α constants (α1, α2, α4) are set at 0.9, or another similar variable. Samples of db0(i, n) are fed to the energy indicator and aed0(i, n) is obtained from Equation (7), below:

$$aed0(i, n) = (1/256)\sum_{k=0}^{255} |X(k, i, n-2) - X(k, i, n)| \quad \text{Equation (7)}$$

Similarly aed(i, n) 520 is computed by inputing samples of db(i, n) 320 to the energy indicator where the implementation is defined as shown in Equation 8, below:

$$aed(i, n) = (1/256)\sum_{k=0}^{255} |X_{MC}(k, i, n-2) - X(k, i, n)| \quad \text{Equation (8)}$$

Parameters aed(i, n) 520 and aed0(i, n) 522 are input to a divider that computes the ratio Rm(i, n)=aed(i, n)/aed0(i, n). Rm(i, n) 523 is modulated by constant α4 and compared to integer 1.0 to obtain the minimum of the two. The result is labeled as Amot, 555. Samples of b(i, n−1) 322 are provided to block difficulty indicator 524, a vertical activity indicator 526, and horizontal activity indicator, 528. The output of block difficulty indicator 524 is BAI(i, n−1) 530 and its derivation is given by Equation 9, below:

$$BAI(i, n-1) = (1/256)\sum_{k=0}^{255} |X(k, i, n-1) - \text{mean}(i, n-1)| \quad \text{Equation (9)}$$

Where $\text{mean}(i, n-1) = (1/256)\sum_{k=0}^{255} X(k, i, n-1)$.

HAI(i, n−1) are given by Equation 10(a) and Equation 10(b), below:

$$VAI(i, n-1) = \quad \text{Equation 10 (a)}$$
$$(1/240)\sum_{q=0}^{15}\sum_{p=0}^{14} |X(p, q, n-1) - X(p+1, q, n-1)|$$

-continued $$HAI(i, n-1) = \quad \text{Equation 10 (b)}$$
$$(1/240)\sum_{p=0}^{15}\sum_{q=0}^{14} |X(p, q, n-1) - X(p, q+1, n-1)|$$

Parameters VAI(i,n−1) and HAI(i,n−1) are supplied to dividers 532 and 534 which compute ratios Rv(i, n−1)=VAI (i, n−1)/BAI(i, n−1) and Rh(i, n−1)=HAI(i, n−1)/BAI (i, n−1). Similarly, ratio Ra(i, n) 536 is obtained as Ra(i, n)=aed(i, n)/BAI (i, n−1). Ratio Ra(i, n) 536 is modulated by constant α3 and compared to integer 1.0 to obtain the minimum of the two. The output of the minimum operator is subtracted from integer 1.0 and the final result is labeled as A1, 540. In order to compute As 542, ratio RSa(j, n) 512 is added to integer 1.0 and the result is modulated by ratio Ra(i, n) 536 and then by α1. The output of this modulation is compared to integer 1.0 to obtain the minimum of the two. The output of the minimum operator is then subtracted from integer 1.0 to form parameter As, 542. Motion vectors MVx 544 and MVy 546 are inputs to two ABS blocks to compute the absolute values of their magnitudes. A set of block-based parameters comprised of $|MV_x|$ 548 and $|MV_y|$ 550, aed(i, n) 516, Rh(i, n−1) 552, Rv(i, n−1) 556, Ra(i, n) 554, Amot 555, A1 540, As 542, and Am 514 are inputs to a large block which describes the perceptual parameter mapping, 558. The outputs of perceptual parameter mapping are Ms 560, Mm 562, and Mt 564.

Figure 6:
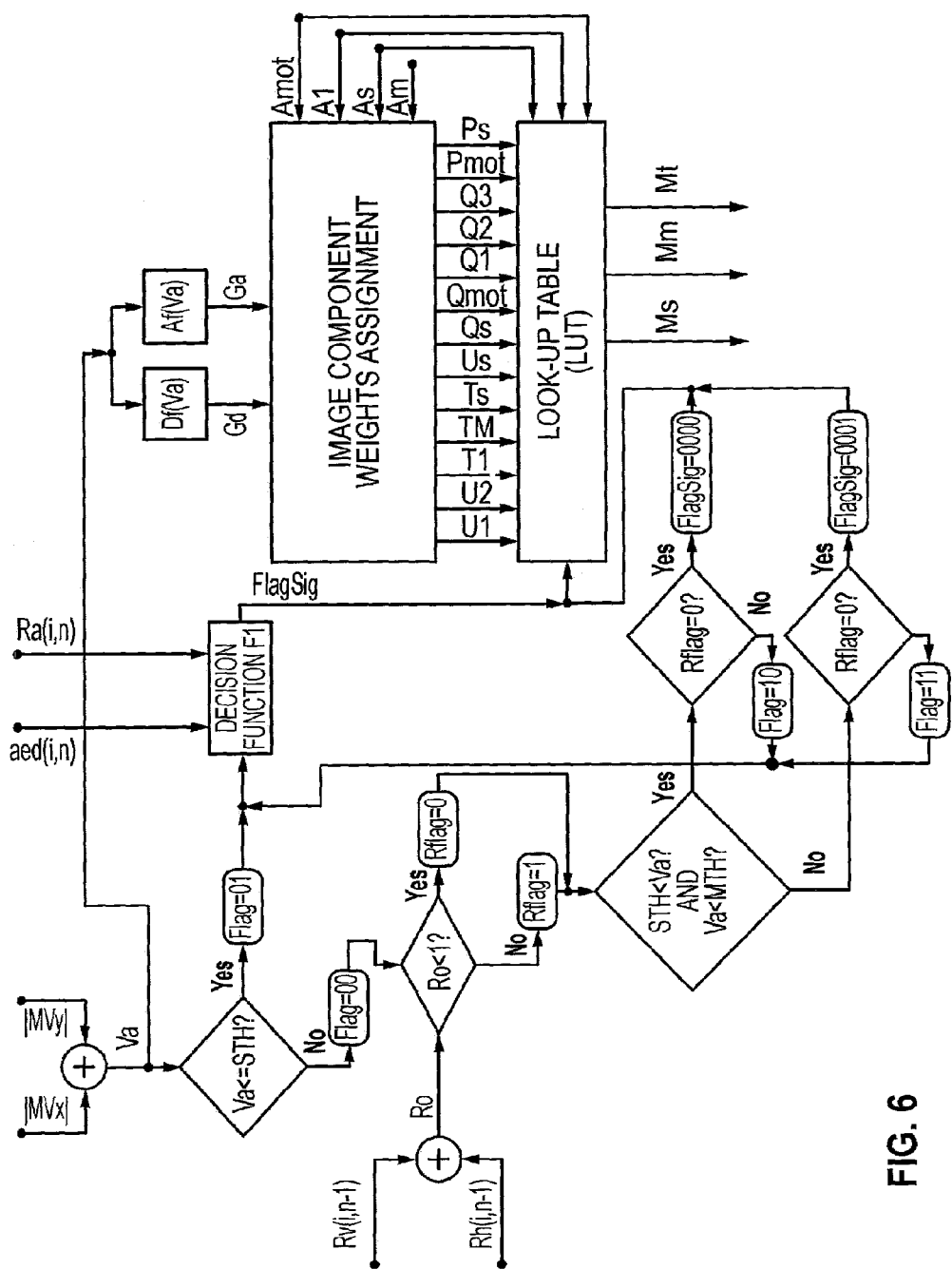
FIG. 6 depicts one embodiment of the perceptual parameter mapping model.

FIG. 6 depicts a framework for perceptual parameter mapping. Motion parameters $|MV_x|$ and $|MV_y|$ are input to the perceptual parameter mapping block and added together to compute motion magnitude Va. Va is compared with pre-defined threshold STH. In one application, the value of STH is set at 1.5. If Va is less than or equal to STH the block is considered to be pre-dominantly static. Flag is set at 01 and sent to decision function F1. Otherwise the Flag is set at 00 and sent to a logic unit to check the magnitude of Ro. Parameter Ro is the result of adding Rv(i, n−1) and Rh(i, n−1). If Ro is less than 1 then Rflag is set at 0, otherwise Rflag is 1. This information is sent to another logic unit which, based on the value of Va, checks if Va is between STH and MTH. In one application, the value of MTH is set at 16. If this holds true and Rflag=0 (i.e., block has motion-edge) then FlagSig=0000. Otherwise Flag is reset at 10 (i.e., block has some motion but no pre-dominant edges). If Va is above MTH with Rflag=0, then the block contains fast motion and edge blocks and FlagSig is set at 0001. Otherwise, if Va is above MTH and Rflag=1, the block contains fast motion but no pre-dominant edges and Flag is reset at 11. Signal Flag is fed to decision function F1. Parameters aed(i, n) and Ra(i, n) are also input to function F1. The output of F1 is FlagSig which along with other determined values of FlagSig are fed to a look-up table (LUT). Also input to LUT are parameters A1, As, and Amot.

The perceptual parameter mapping also has an image component weights assignment task. This task is composed of computing a finite set of weights from which parameters Ms, Mm, and Mt are to be selected. The set of weights are computed from inputs Am, A1, As, Amot, Ga, and Gd and the result is stored in the LUT block. Variables Ga and Gd are derived from functions Af(.) and Df(.), respectively, using Va as the input argument. Function Af(Va) (Df(Va)) is designed to be an increasing (decreasing) function as argument Va is swept from slightly larger than STH to slightly smaller than MTH. Therefore, for the range STH<Va<MTH, as Va becomes larger, the contribution from the motion image component becomes larger. Examples for Af(Va) and Df(Va) are (Va−STH)/(MTH−STH) and (MTH−Va)/(MTH−STH), respectively.

It should be noted that the image component weights assignment is performed in real-time. Some of the weights are computed per pixel and some of the weights are computed per block. The weights are used to render the population of the LUT block. LUT receives the FlagSig signal and maps this into a set of three weights which are assigned to Ms, Mm, and Mt. FIG. 7 displays one example of the LUT population, and further, the one-to-one relationship between FlagSig and a row of weights.

Figure 8:
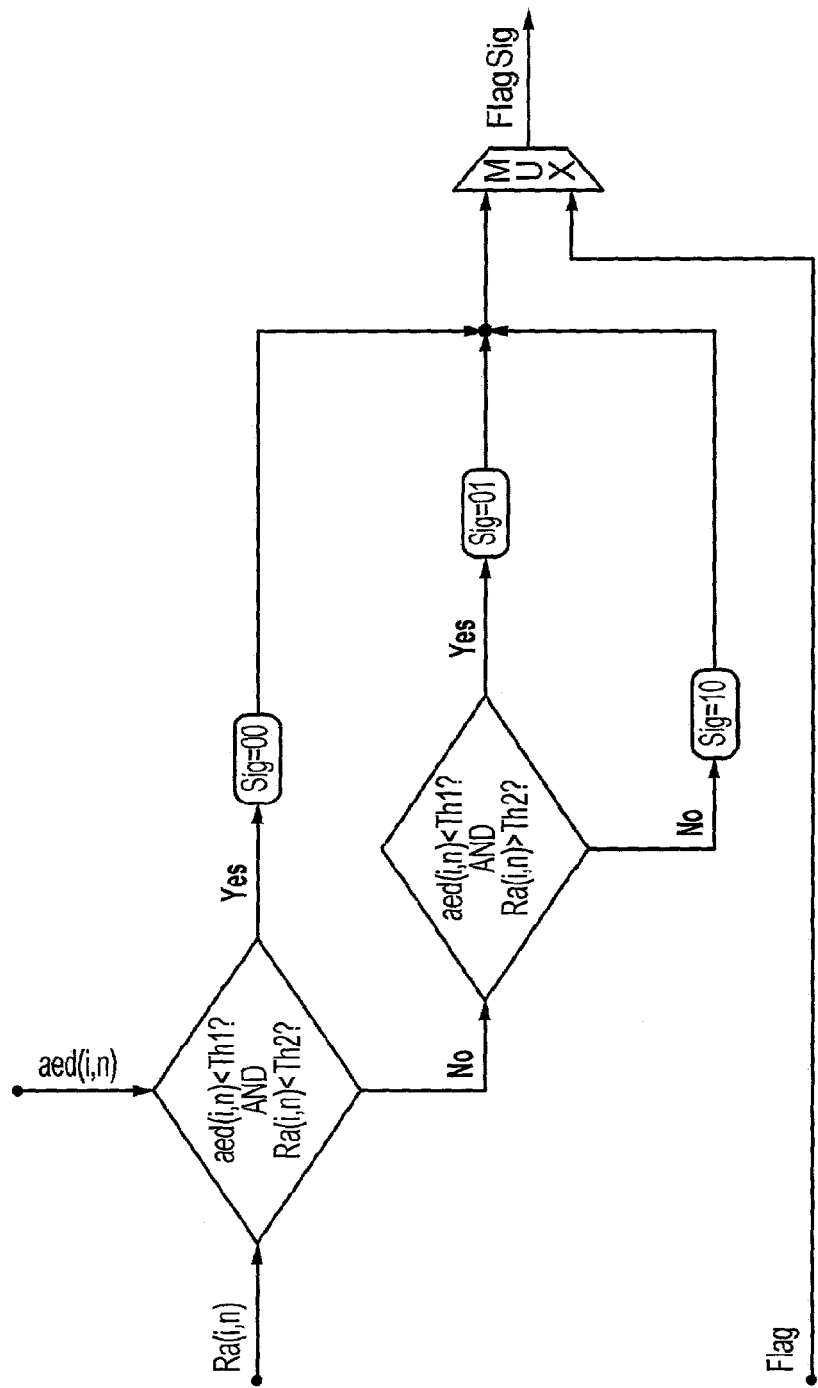
FIG. 8 depicts one embodiment of a decision function consistent with the present invention.

Except for the case where the image block has motion-edge pixels, function F1 determines the contribution from static and texture image components given to the final interpolated pixel. Various units of function F1 are depicted in FIG. 8. Parameters Ra(i, n) and aed(i, n) are inputs to a logic unit which examines if both conditions aed(i, n)<Th1 and Ra(i, n)<Th2 hold true. In an application, thresholds Th1 and Th2 are chosen as 10 and 0.4, respectively. If the aforementioned conditions are met, then Sig=00, otherwise a second login unit examines if conditions aed(i, n)>Th1 and Ra(i, n)>Th2 are both true. If so, then Sig=01, otherwise Sig=10. Binary values of Flag and Sig are multiplexed together via block MUX to form binary signal FlagSig. FlagSig is the output of function F1 which is fed to LUT block.

Figure 9:
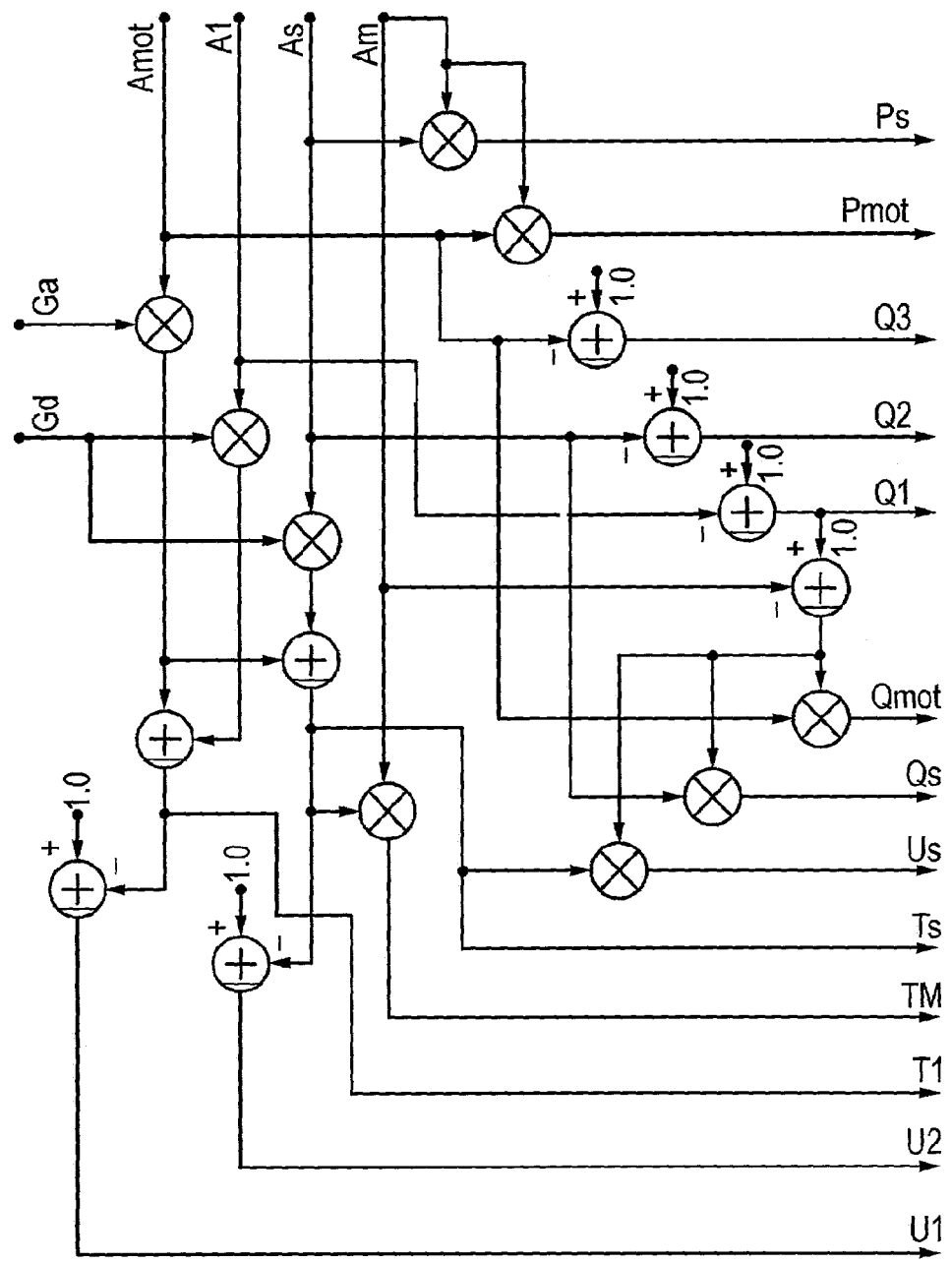
FIG. 9 depicts one embodiment of operators of image component weights assignment.

The image component weights assignment block is shown in FIG. 9. This block consists of several adders and multipliers which operate on input parameters Amot, A1, As, Am, Gd, and Ga. The adders and multipliers derive a bank of weighting coefficients in real time. These weights are to be assigned to static, texture, and motion image components. The weights are computed using the following procedure: weights Ps and Pmot are obtained by multiplying Am by As and Am by Amot, respectively; weights Q1, Q2, and Q3 are obtained by subtracting A1, As, and Amot from a nominal value of 1.0, respectively; weights Qmot and Qs are computed by first subtracting Am from 1.0 (i.e., (1−Am)), and then multiplying (1−Am) by Amot and As, respectively; weight Ts is computed in two stages. In the first stage As is multiplied by Gd and Amot is multiplied by Ga. In the second stage the results from previous stage are summed (i.e., As×Gd+Amot×Ga) to form Ts. Ts is then multiplied by (1−Am) to form Us. Weight Tm is obtained by multiplying Ts by Am. Ts is also subtracted from 1.0 to form U2. Weight T1 is computed by first multiplying Amot by Ga, and A1 by Gd, and then summing the results. Finally, T1 is subtracted from 1.0 to form U1.

A software solution can be utilized to implement the method taught. The method disclosed is not restricted to a specific software, software language or software architecture. Each of the steps of the method disclosed may be performed by a module (e.g., a software module) or a portion of a module executing on a computer system. Thus, the above component organization may be executed on a laptop, desktop or other computer system. The method may be embodied in a machine-readable and/or computer-readable medium for configuring a computer system to execute the method. Thus, the software modules may be stored within and/or transmitted to a computer system memory to configure the computer system to perform the functions of the module.

It is appreciated that operations discussed herein may include, for example, directly entered commands by a computer system user, steps executed by application specific hardware modules, steps executed by software modules, or combinations thereof.

The software modules discussed herein which perform the described steps may include script, batch or other executable files, or combinations and/or portions of such files. The software modules may include software code as well as data and may be encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described herein are for illustration only. Operations may be combined or the functionality of the operations may be distributed in additional operations in accordance with the invention.

The operations described above and modules therefor may be executed on a computer system configured to execute the operations of the method and/or may be executed from computer-readable media. The method may be embodied in a machine-readable and/or computer-readable medium for configuring a computer system to execute the method. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims.

What is claimed is:

1. A method for converting interlaced video fields into progressive video fields, said method comprising:
   computing static, motion, and texture components for all pixels of a sub-partition of an interlaced field;
   determining portions of the static, motion, and texture components that contribute to a pixel of a progressive field;
   wherein the portions of the computed static, motion, and texture components that contribute to the pixel of the progressive field is determined using a perceptual model;
   adjusting one or more of the static, motion, and texture components;
   summing the adjusted one or more static, motion, and texture components;
   receiving a past interlaced field and a future interlaced field, wherein the interlaced field is received after the past interlaced field but before the future interlaced field;
   where adjustment of the static image component comprises an act of reducing said static image component by a modulation factor Ra, where said modulation factor is computed by scaling an aed factor by BAI, wherein said aed factor is derived by computing an average energy of a difference between a block in the future interlaced field and a prediction of a corresponding block in the past interlaced field, and further, said BAI is obtained by computing an image difficulty of a block in the field.

2. The method of claim 1, where the modulation factor Ra is further modulated to create a second modulation factor RSa, said RSa is comprised of scaling an aeds factor by SVAI, said aeds factor is derived by computing an average energy of a difference between a sub-block of the block in the future field and a prediction of the a sub-block of the corresponding block in the past field, and further, said SVAI is obtained by computing an average vertical image difficulty of the said sub-block in the future field and a third sub-block in the past field, the third sub-block in the past field having coordinates equal to coordinates of said sub-block in the future field.

3. The method of claim 2 where the block and sub-block predictions use the same motion information.

4. The method of claim 1, where the static image component is modulated by a factor Rm, wherein Rm is calculated by scaling the aed factor of by aed0 where said aed0 is derived by computing the average energy of the difference between the block in future field and the corresponding block in the past field, said corresponding block in the past field having the same coordinates as the said block in future field.

5. The method of claim 1, when the nominal values of Ra and aed are large, only contributions from the texture image component and the motion image component are used.

6. The method of claim 5, when a small amount of motion for a block of samples is detected, said block has a dominant texture image component.

7. A method for converting video data from interlaced format to progressive format, comprising:
   determining a probability of a first image component of a field, wherein the determination assigns a priority to the first image component; and
   determining a probability of a second image component of the field, where the determination assigns a priority to the second image component;
   receiving first and second fields, wherein the field is received before the second field but after the first field;
   partitioning the first field to produce a first block of samples;
   partitioning a the second field to produce a second block of samples;
   determining a first image component for the first block of samples;
   determining a second image component based on the second block of samples;
   modulating the first image component based on an average energy ("aed") of a difference between the second block and a prediction of the first block in the first field scaled by an image difficulty of a block ("BAI") in the field.

8. The method of claim 7, further comprising:
   computing an average energy of the differences between a sub-block in the second field and a prediction of a corresponding sub-block in the first field;
   computing an average vertical image difficulty of the sub-block in the second field and the corresponding sub-block in first field, the sub-block in first field having the same coordinates as the sub-block in second field;
   modulating the first image component based on the average energy; and
   modulating the first image component based on the average vertical image difficulty.

9. The method of claim 7, further including:
   computing an average energy ("aed0") of a difference between a block in the second field and a corresponding block in the first field, the block in the second field having a first set of coordinates, the corresponding block in the first field having a second set of coordinates, wherein the first set of coordinates and the second set of coordinates are substantially equal; and
   modulating the first image component based on the average energy of the difference between the block in the second field and the corresponding block in the first field.

10. The method as recited in claim 7, further including:
    modulating the second image component based on an average energy ("aed") of a difference between a block in the second field and a prediction of the corresponding block in the first field scaled by an image difficulty of a block ("BAI") in the field.

* * * * *